(12) United States Patent
Yokozutsumi et al.

(10) Patent No.: US 9,178,450 B2
(45) Date of Patent: Nov. 3, 2015

(54) CONTROL DEVICE AND CONTROL METHOD FOR ELECTRIC MOTOR, AND MOTOR AND VEHICLE DRIVING SYSTEM TO WHICH THE CONTROL DEVICE AND CONTROL METHOD ARE APPLIED

(75) Inventors: Ryo Yokozutsumi, Tokyo (JP); Akihiro Murahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/348,293

(22) PCT Filed: Sep. 30, 2011

(86) PCT No.: PCT/JP2011/072643
§ 371 (c)(1),
(2), (4) Date: Apr. 8, 2014

(87) PCT Pub. No.: WO2013/046460
PCT Pub. Date: Apr. 4, 2013

(65) Prior Publication Data
US 2014/0225547 A1 Aug. 14, 2014

(51) Int. Cl.
*H02P 6/14* (2006.01)
*H02P 6/00* (2006.01)
(Continued)

(52) U.S. Cl.
CPC ............. *H02P 6/002* (2013.01); *B60L 15/06* (2013.01); *H02P 6/14* (2013.01); *H02P 27/047* (2013.01);
(Continued)

(58) Field of Classification Search
CPC .................. H02P 27/08; H02P 27/04

USPC ................................... 318/400.27
See application file for complete search history.

(56) References Cited

U.S. PATENT DOCUMENTS

| 5,321,599 A | 6/1994 | Tanamachi et al. |
| 5,680,299 A | 10/1997 | Yasuda et al. |

(Continued)

FOREIGN PATENT DOCUMENTS

| EP | 0808016 A1 | 11/1997 |
| EP | 2036195 B1 | 1/2010 |

(Continued)

OTHER PUBLICATIONS

Office Action (Notice of Preliminary Rejection) issued on Mar. 25, 2015, by the Korean Intellectual Property Office in corresponding Korean Patent Application No. 10-2014-7008167, and an English Translation of the Office Action. (8 pages).

(Continued)

*Primary Examiner* — Erick Glass
(74) *Attorney, Agent, or Firm* — Buchanan Ingersoll & Rooney PC

(57) ABSTRACT

There is provided a control device for an electric motor that controls the operation of the electric motor by outputting PWM signals to switching elements included in an inverter. The control device for the electric motor includes a voltage-command generating unit configured to generate, as voltage commands Vu*, Vv*, and Vw*, a superimposed wave signal obtained by superimposing, on a sine wave having an inverter output frequency FINV as a fundamental frequency, a third harmonic of the sine wave and a PWM-signal generating unit configured to generate PWM signals U, V, W, X, Y, and Z by comparing the amplitude of the voltage commands output by the voltage-command generating unit and the amplitude of a carrier signal CAR.

8 Claims, 5 Drawing Sheets

(51) Int. Cl.
  *B60L 15/06* (2006.01)
  *H02P 27/08* (2006.01)
  *H02P 27/04* (2006.01)
  *H02M 7/5395* (2006.01)

(52) U.S. Cl.
  CPC .......... *H02P 27/085* (2013.01); *B60L 2200/26* (2013.01); *H02M 7/5395* (2013.01); *H02P 27/04* (2013.01); *H02P 27/08* (2013.01); *Y02T 10/642* (2013.01)

(56) References Cited

U.S. PATENT DOCUMENTS

| | | | |
|---|---|---|---|
| 8,018,195 | B2 | 9/2011 | Ohtani et al. |
| 8,222,857 | B2 | 7/2012 | Kitanaka |
| 2006/0049792 | A1* | 3/2006 | Chen et al. .................... 318/716 |
| 2010/0231151 | A1 | 9/2010 | Ohtani et al. |
| 2011/0043149 | A1 | 2/2011 | Kitanaka |
| 2011/0187308 | A1* | 8/2011 | Suhama et al. ............... 318/798 |
| 2011/0266992 | A1* | 11/2011 | Nishiguchi et al. ........... 318/807 |
| 2014/0232318 | A1* | 8/2014 | Yokozutsumi et al. ....... 318/722 |
| 2014/0361720 | A1* | 12/2014 | Miyachi et al. .......... 318/400.39 |

FOREIGN PATENT DOCUMENTS

| | | |
|---|---|---|
| EP | 2194643 A1 | 6/2010 |
| JP | H08-251930 A | 9/1996 |
| JP | 2005-045846 A | 2/2005 |
| JP | 2005-137200 A | 5/2005 |
| JP | 2005-176600 A | 6/2005 |
| JP | 2005-348597 A | 12/2005 |
| JP | 2011-146686 A | 7/2011 |
| WO | WO 2008/152929 A1 | 12/2008 |

OTHER PUBLICATIONS

International Search Report (PCT/ISA/210) mailed on Dec. 20, 2011, by the Japanese Patent Office as the International Searching Authority for International Application No. PCT/JP2011/072643.

Written Opinion (PCT/ISA/237) mailed on Dec. 20, 2011, by the Japanese Patent Office as the International Searching Authority for International Application No. PCT/JP2011/072643.

European Search Report dated Jul. 22, 2015 issued in corresponding European Patent Appln. No. 11873266.8 (10 pages).

* cited by examiner

Prior Art

CONTROL DEVICE AND CONTROL METHOD FOR ELECTRIC MOTOR, AND MOTOR AND VEHICLE DRIVING SYSTEM TO WHICH THE CONTROL DEVICE AND CONTROL METHOD ARE APPLIED

FIELD

The present invention relates to a control device and a control method for an electric motor and an electric motor and a vehicle driving system to which the control device and the control method are applied.

BACKGROUND

Concerning PWM inverter control for an electric motor that drives an electric vehicle, there have been posed problems, as described in Patent Literature 1, because the electric motor is controlled by a plurality of control modes, i.e., a problem in that a harsh tone change due to magnetic noise occurs during switching between the number of pulses (hereinafter number-of-pulse switching) in a multi-pulse mode and a problem in that generated torque of the motor fluctuates during the switching between a three-pulse mode and a one-pulse mode. Note that the three-pulse mode is a mode always operated with three pulses included in a half cycle of an inverter output voltage. The one-pulse mode is a mode always operated with one pulse included in the half cycle of the inverter output voltage.

CITATION LIST

Patent Literature

Patent Literature 1: Japanese Patent Application Laid-Open No. 2005-137200

SUMMARY

Technical Problem

To solve the problems, in Patent Literature 1, an output voltage is controlled substantially continuously according to a combination of the multi-pulse mode and the one-pulse mode. However, in Patent Literature 1, there are a plurality of control modes including a pulse width modulation (PWM control) mode, an asynchronous overmodulation control mode, and a one-pulse control mode. Mode switching control for sequentially shifting the control modes in this order is essential. Therefore, the control of the output voltage is not considered to be completely continuous. There is a problem in that harsh magnetic noise caused by a switching element of an inverter and an electric motor remains.

Further, in Patent Literature 1, a voltage in a rectangular wave is applied to the electric motor in the one-pulse mode in a high speed range. Therefore, there is also recognized a problem in that vibration caused by a harmonic component is relatively large.

The present invention has been devised in view of the above and it is an object of the present invention to provide a control device and a control method for an electric motor for enabling a further reduction in harsh magnetic noise and vibration due to a harmonic component and an electric motor and a vehicle driving system to which the control device and the control method are applied.

Solution to Problem

In order to solve the afore-mentioned problems, a control device for an electric motor that controls an operation of the electric motor by outputting PWM signals to switching elements included in an inverter, the inverter being capable of converting an input direct-current voltage into an alternating-current voltage having an arbitrary frequency and an arbitrary voltage according to one aspect of the present invention is configured to include: a voltage-command generating unit configured to generate, as voltage commands, a superimposed wave signal obtained by superimposing, on a sine wave having an output frequency of the inverter as a fundamental frequency, a third harmonic of the sine wave; and a PWM-signal generating unit configured to generate the PWM signals by comparing amplitude of the voltage commands output by the voltage-command generating unit and amplitude of a predetermined carrier signal.

Advantageous Effects of Invention

According to the present invention, there is an effect that it is possible to further reduce harsh magnetic noise and vibration caused by a harmonic component.

DESCRIPTION OF EMBODIMENTS

A control device and a control method for an electric motor according to an embodiment of the present invention and an electric motor and a vehicle driving system to which the control device and the control method are applied are explained below with reference to the accompanying drawings. Note that the present invention is not limited by the embodiment explained below.

Figure 1:
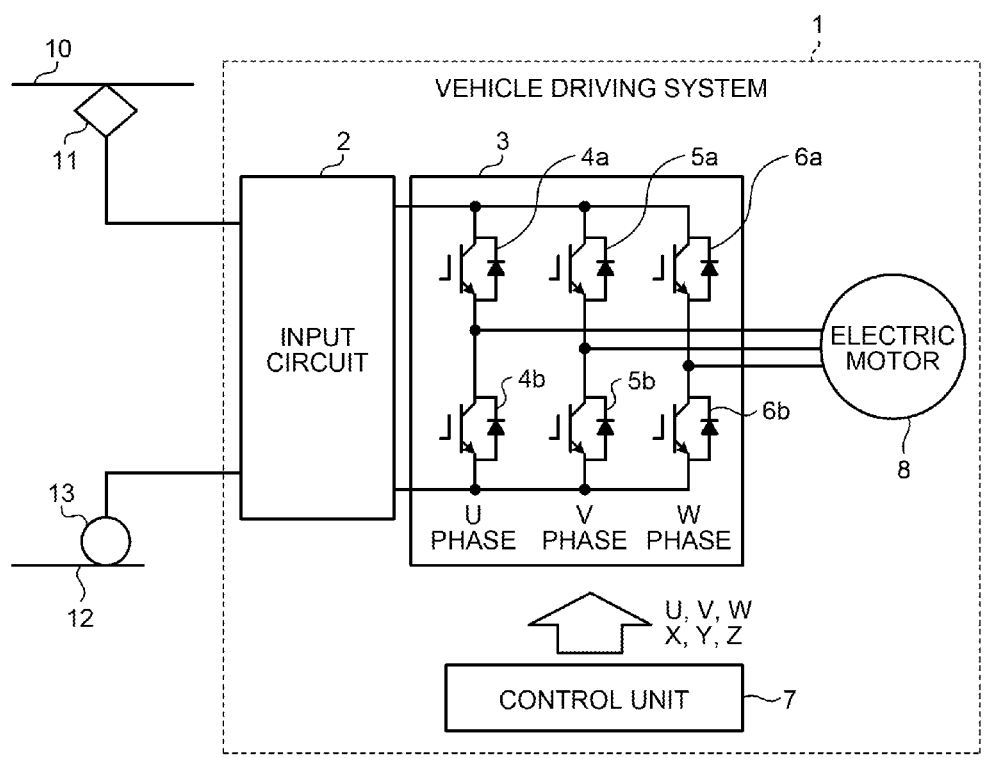
FIG. 1 is a diagram of a configuration example of a vehicle driving system including a control device for an electric motor according to an embodiment.

FIG. 1 is a diagram of a configuration example of a vehicle driving system including a control device for an electric motor according to an embodiment of the present invention. A vehicle driving system 1 according to this embodiment includes, as shown in FIG. 1, an input circuit 2 including at least a switch, a filter capacitor, and a filter reactor, an inverter 3 including switching elements 4a, 5a, 6a, 4b, 5b, and 6b, at least one electric motor 8 for driving an electric vehicle being connected to the inverter 3, and a control unit 7 configured to generate PWM signals U, V, W, X, Y, and Z for respectively subjecting the switching elements 4a, 5a, 6a, 4b, 5b, and 6b included in the inverter 3 to PWM control. Note that, for the electric motor 8 connected to the inverter 3, an induction motor or a synchronous motor is suitable.

In FIG. 1, one end of the input circuit 2 is connected to an overhead wire 10 via a current collector 11 and the other end of the input circuit 2 is connected via a wheel 13 to a rail 12 having earth potential. Direct-current power or alternating-current power supplied from the overhead wire 10 is input to the one end of the input circuit 2 via the current collector 11. Electric power (a direct-current voltage) generated at the output end of the input circuit 2 is input (applied) to the inverter 3.

The inverter 3 includes legs to which a positive side arm (e.g., 4a in a U phase) configured from the switching elements 4a, 5a, and 6a and a negative side arm (e.g., 4b in a U phase) configured from the switching elements 4b, 5b, and 6b are respectively connected in series. That is, in the inverter 3, a three-phase bridge circuit including three pairs of legs (for the U phase, for a V phase, and for a W phase) is configured. Note that, for the switching elements 4a, 5a, 6a, 4b, 5b, and 6b, IGBT elements or IPM elements incorporating anti-parallel diodes are suitable.

The inverter 3 subjects the switching elements 4a, 5a, 6a, 4b, 5b, and 6b to the PWM control on the basis of a switching signal (a PWM signal) output from the control unit 7 to thereby convert the direct-current voltage output from the input circuit 2 into an alternating-current voltage having an arbitrary frequency and an arbitrary voltage and outputs the alternating-current voltage. Note that, in the configuration example shown in FIG. 1, the number of legs is three (three pairs). However, the number of legs is not limited to this number of legs.

The control unit 7 according to this embodiment is explained here. First, in comparison with the control unit 7 according to this embodiment that can be realized with an extremely simple and concise configuration and has an extremely excellent effect, the configuration and the operation of a general control unit according to a related art are explained in detail.

Figure 2:
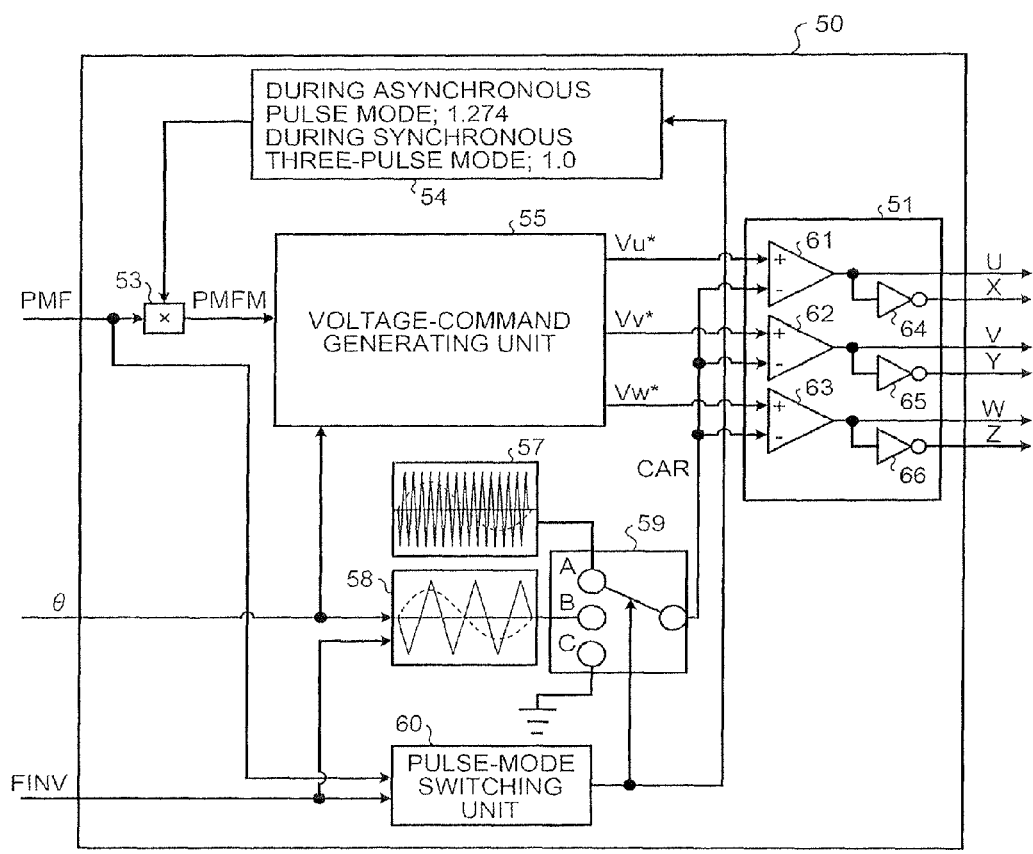
FIG. 2 is a diagram of a configuration example of a general control unit in a conventional system.

FIG. 2 is a diagram of a configuration example of a general control unit 50 according to the related art. The control unit 50 according to the related art includes, as shown in FIG. 2, a multiplier 53, an adjustment gain table 54, a voltage-command generating unit 55, an asynchronous-carrier-signal generating unit 57, a synchronous-three-pulse-carrier-signal generating unit 58, a switch 59, a pulse-mode switching unit 60, and a PWM-signal generating unit 51 including comparators 61 to 63 and inverting circuits 64 to 66.

The voltage-command generating unit 55 generates, on the basis of Formulas (1) to (3) shown below, a U-phase voltage command Vu*, a V-phase voltage command Vv*, and a W-phase voltage command Vw*, which are three-phase voltage commands, with a modulation factor PMF and a control phase angle θ.

$$Vu^* = PMFM \cdot \sin \theta \quad (1)$$

$$Vv^* = PMFM \cdot \sin(\theta - (2 \cdot \pi/3)) \quad (2)$$

$$Vw^* = PMFM \cdot \sin(\theta - (4 \cdot \pi/3)) \quad (3)$$

PMFM included in Formulas (1) to (3) represents voltage command amplitude obtained by multiplying the modulation factor PMF by an output of the adjustment gain table 54. The adjustment gain table 54 is a table for correcting a difference between a relation of an inverter output voltage with respect to the modulation factor PMF for an asynchronous pulse mode and that for a synchronous three-pulse mode. The adjustment gain table 54 is schematically as explained below.

In the asynchronous pulse mode, a maximum voltage (an effective value), which an inverter can output without distortion, is 0.612·EFC. In the synchronous three-pulse mode, the maximum voltage is 0.7797·EFC. That is, in the asynchronous pulse mode, compared with the synchronous three-pulse mode, an inverter output voltage with respect to the modulation factor PMF is 0.7797/0.612=1.274. To cancel a difference between the pulse modes, in the asynchronous pulse mode, the modulation factor PMF is multiplied by 1.274 and input to the voltage-command generating unit 55 as voltage command amplitude PMFM. On the other hand, in the synchronous pulse mode, the modulation factor PMF is multiplied by 1.0 and input to the voltage-command generating unit 55 as the voltage command amplitude PMFM.

A carrier signal CAR to be compared with the voltage commands is a signal that is selected from an asynchronous carrier signal A generated by the asynchronous-carrier-signal generating unit 57, a synchronous three-pulse carrier signal B generated by the synchronous-three-pulse-carrier-signal generating unit 58, and a zero value C selected with respect to the one-pulse mode, according to switching by the pulse-mode switching unit 60. Note that a synchronous carrier signal is a signal that is made by determining the frequency of the carrier signal CAR as a function of an inverter output frequency FINV such that the number of pulses forming an inverter output voltage and the positions of the pulses are the same in the positive side half cycle and the negative side half cycle of the inverter output voltage. An asynchronous carrier signal is a signal that is not the synchronous carrier signal and is a carrier signal having a frequency determined regardless of the inverter output frequency FINV.

The magnitude of the U-phase voltage command Vu*, the V-phase voltage command Vv*, and the W-phase voltage command Vw* output from the voltage-command generating unit 55 are compared with the carrier signal CAR respectively by the comparators 61 to 63. PWM signals U, V, and W obtained as a result of the comparison and PWM signals X, Y, and Z obtained from the PWM signals U, V, and W via the inverting circuits 64 to 66 are generated. Note that the inverter 3 is controlled by the PWM signals U V, W, X, Y, and Z. Desired alternating-current power is supplied to the electric motor 8 from the inverter 3 and the operation of the electric motor 8 is controlled.

Figure 3:
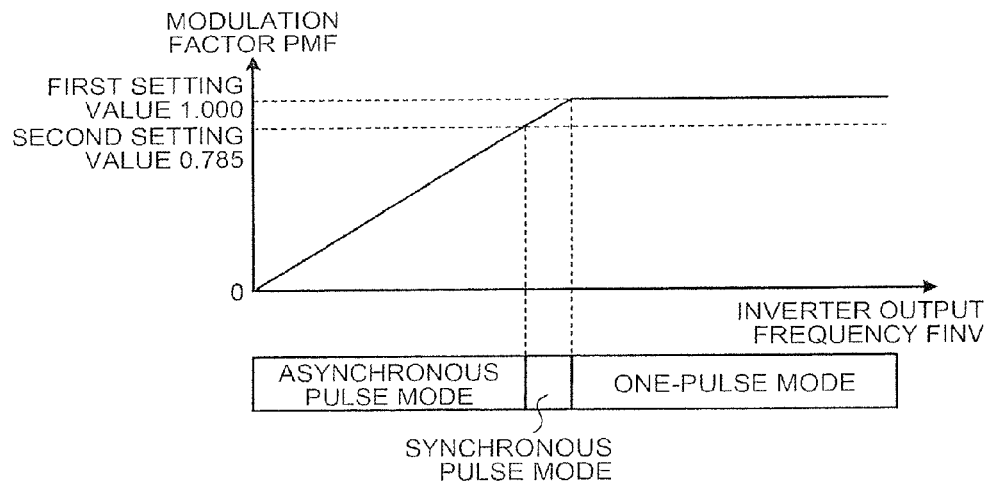
FIG. 3 is a diagram explaining a pulse mode switching operation in the conventional system.
Figure 4:
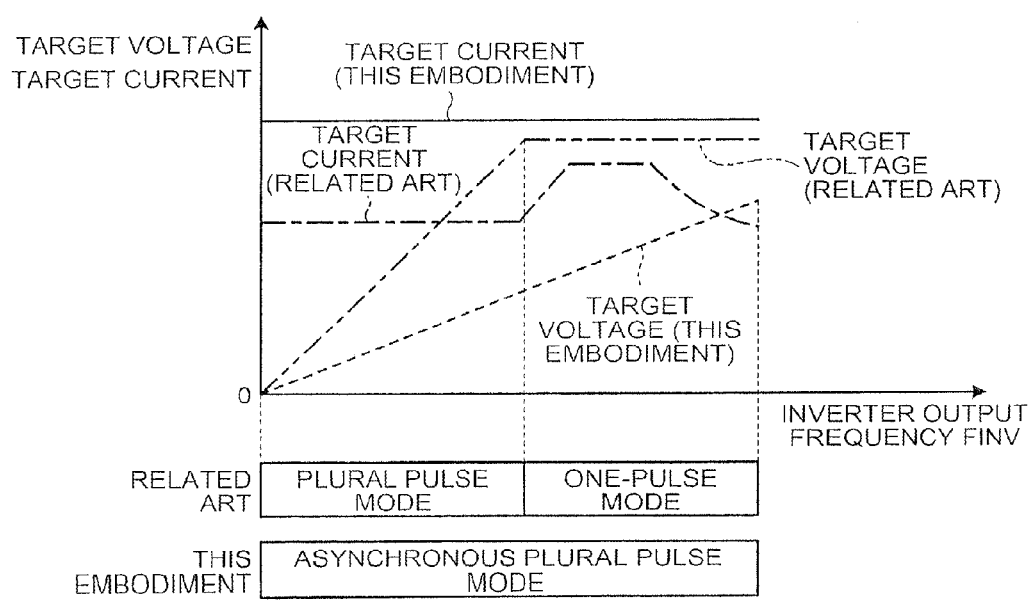
FIG. 4 is a diagram explaining the concept of electric motor control according to the embodiment in comparison with related art.

FIG. 3 is a diagram for explaining a pulse mode switching operation in a conventional system. As shown in FIG. 4, the pulse-mode switching unit 60 switches between the asynchronous pulse mode, the synchronous pulse mode (e.g., the synchronous three-pulse mode), and the one-pulse mode according to the modulation factor PMF. More specifically, the pulse-mode switching unit 60 switches the switch 59 to the asynchronous carrier A side in a region where the modulation factor PMF is low (the modulation factor PMF is equal to or smaller than a first setting value 0.785 (=1/1.274)), switches the switch 59 to the synchronous three-pulse carrier B side when the modulation factor PMF is equal to or larger than the first setting value and smaller than a second setting value, and switches the switch 59 to the zero value C side when the modulation factor PMF reaches the second setting value.

As explained above, it is hard to consider that the configuration of the control unit in the conventional system is simple. In the control unit in the conventional system, switching of the control mode is always present. Therefore, as explained in the problems, even if improvement within the range of the conventional system is performed, the switching control for the control mode is essential. The problem of the remaining harsh magnetic noise is not completely eliminated. Further, the one-pulse mode is used in a high speed range. Therefore, there is a disadvantage in that vibration caused by the electric motor because of a harmonic component is larger than the vibration in the other modes and thus measures against the vibration need to be taken.

FIG. 4 is a diagram explaining the concept of electric motor control according to the embodiment in comparison with the related art. In FIG. 4, a waveform indicated by a solid line represents a target current (a target current for the electric motor; the same applies in the following explanation). A waveform indicated by a broken line represents a target voltage (a target voltage for the electric motor; the same applies in the following explanation). Further, a waveform indicated by an alternate long and short dash line represents a target current according to the related art. A waveform indicated by an alternate long and short dash line represents a target voltage according to the related art.

As explained above and shown in FIG. 4, in the conventional electric motor control, during a plurality of pulse modes such as the asynchronous pulse mode and the synchronous pulse mode, the target voltage is increased in proportion to an inverter output frequency (synonymous with the speed of the electric motor). In the one-pulse mode, the target voltage is controlled so as to be fixed. On the other hand, in the electric motor control according to this embodiment, in all control regions (in an electric motor for a vehicle, all speed regions), an asynchronous plural pulse mode (asynchronous plural pulse control), which is a single control mode, is adopted. That is, in this embodiment, in all the control regions, control for increasing the target voltage in proportion to the inverter output frequency is performed. Note that, as shown in FIG. 4, in this embodiment, the target voltage is set low compared with the target voltage in the related art and the target current is set high compared with the target current in the related art. That is, in this embodiment, according to the adoption of the asynchronous plural pulse mode (the asynchronous plural pulse control) in all the control regions, because the target voltage (a voltage command) cannot be set high, the target current (a current command) is set higher than the target current in the related art. Because electric power supplied to the electric motor is proportional to a product of a voltage and an electric current, even if the target voltage is low, it is possible to supply electric power equal to (or equal to or larger than) the electric power supplied in the past.

Figure 5:
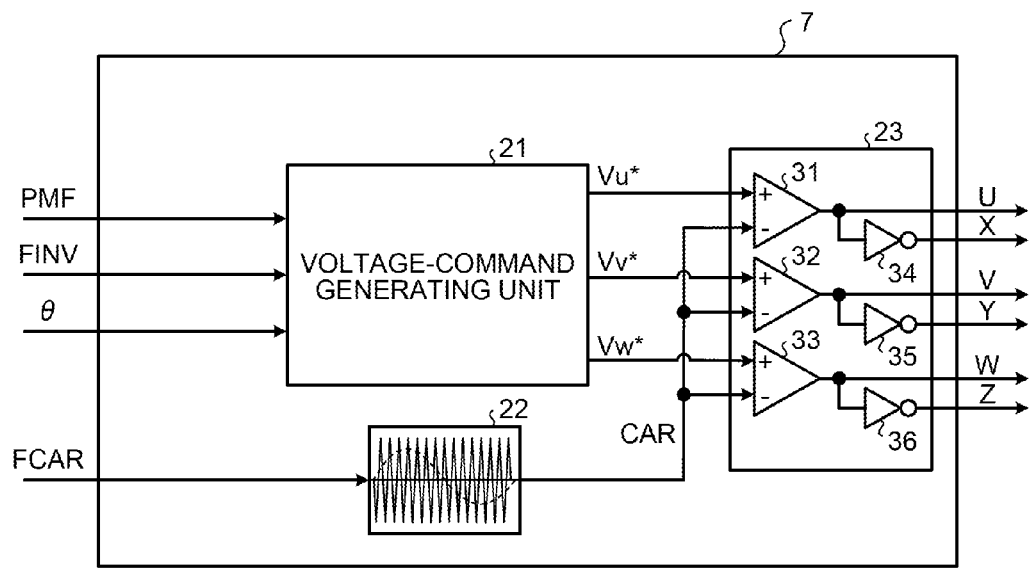
FIG. 5 is a diagram of a configuration example of a control unit according to the embodiment.

The control unit 7 according to this embodiment is explained. FIG. 5 is a diagram of a configuration example of the control unit 7 according to this embodiment. The control unit 7 according to this embodiment includes, as shown in FIG. 5, a voltage-command generating unit 21, an asynchronous-carrier-signal generating unit 22, and a PWM-signal generating unit 23 including comparators 31 to 33 and inverting circuits 34 to 36. As is evident when FIG. 5 and FIG. 2 are compared, in the control unit 7 according to this embodiment, the multiplier 53, the adjustment gain table 54, the synchronous-three-pulse-carrier-signal generating unit 58, the switch 59, and the pulse-mode switching unit 60, which are necessary in the control unit 50 according to the related art, are made unnecessary. It is seen that the control unit 7 can be realized by an extremely simple configuration.

Figure 6:
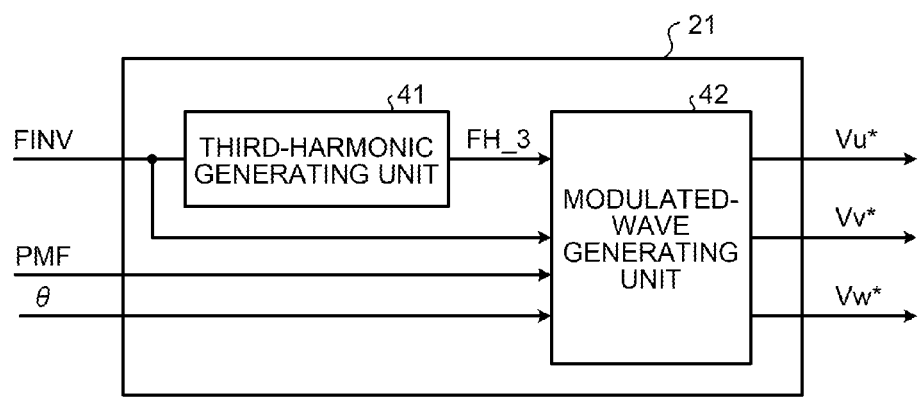
FIG. 6 is a diagram of a configuration example of the voltage-command generating unit shown in FIG. 5.

FIG. 6 is a diagram of a configuration example of the voltage-command generating unit 21 shown in FIG. 5. The voltage-command generating unit 21 includes, as shown in FIG. 6, a third-harmonic generating unit 41 configured to generate a third harmonic wave (hereinafter abbreviated as "third harmonic") FH_3 from the inverter output frequency FINV and a modulated-wave generating unit 42 configured to generate the U-phase voltage command Vu*, V-phase voltage command Vv*, and the W-phase voltage command Vw* on the basis of the inverter output frequency FINV, the third harmonic FH_3, the modulation factor PMF, and the control phase angle θ. In the modulated-wave generating unit 42, the third harmonic FH_3 generated by the third-harmonic generating unit 41 is superimposed on a sine wave (or a cosine wave) having the inverter output frequency FINV as a fundamental frequency. The amplitude and the phase of a superimposed wave signal are respectively adjusted by the modulation factor PMF and the control phase angle θ. Modulated waves Vu*, Vv*, and Vw* are generated as voltage commands and output to the PWM-signal generating unit 23. Note that the operation of the PWM-signal generating unit 23 is as explained above.

Figure 7:
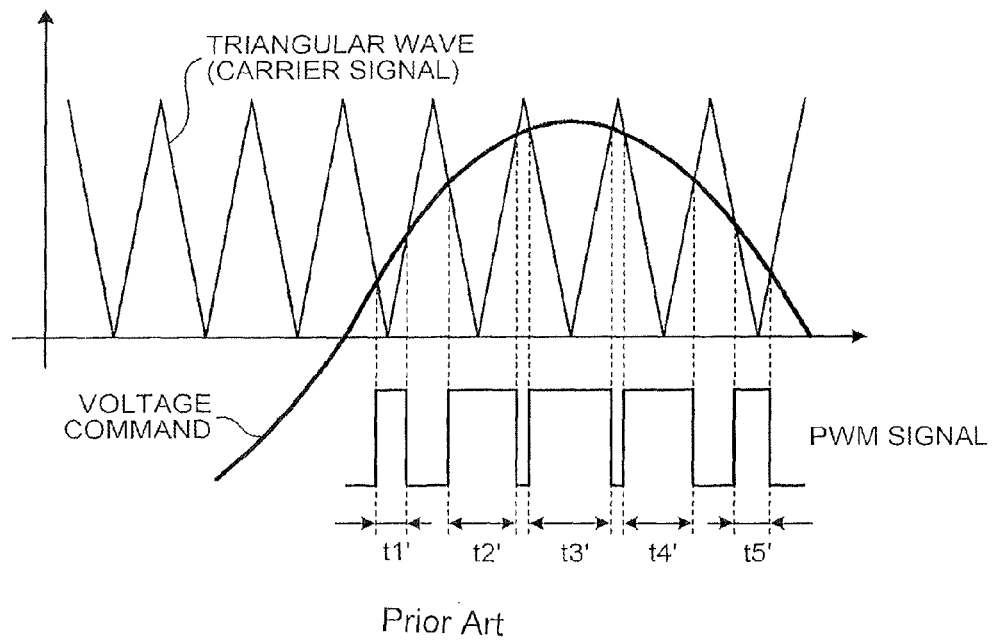
FIG. 7 is a diagram of an example of a PWM signal waveform generated by a voltage command (a modulated wave) according to the related art.

FIG. 7 is a diagram of an example of a PWM signal waveform generated by a voltage command (a modulated wave) according to the related art. In FIG. 7, a voltage command waveform indicated by a thick line represents a signal waveform in an arbitrary phase (e.g., the U phase) generated by the voltage-command generating unit 55 shown in FIG. 2. A signal waveform (a PWM signal) formed by the voltage command and a triangular wave (a carrier signal) is a PWM signal waveform generated by the PWM-signal generating unit 51 shown in FIG. 2.

Figure 8:
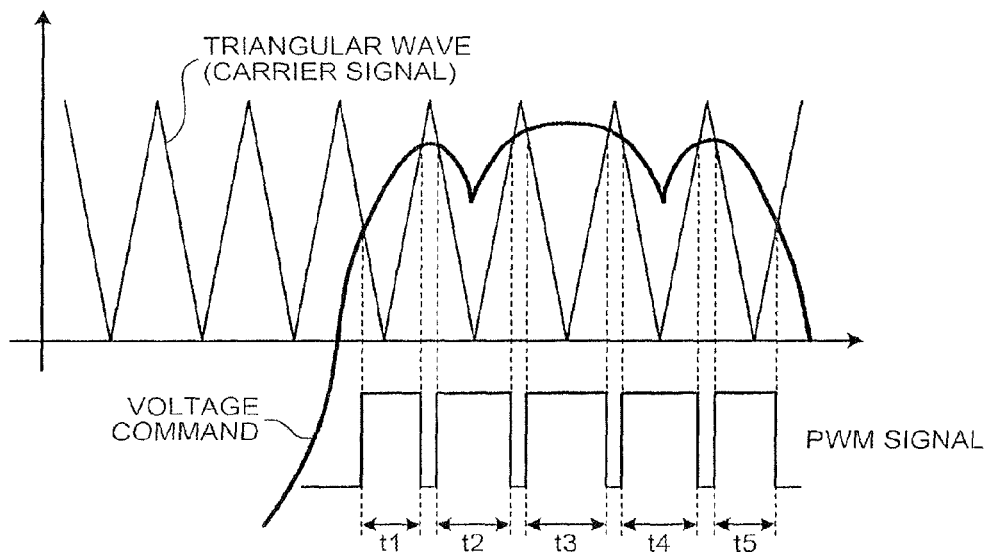
FIG. 8 is a diagram of an example of a PWM signal waveform generated by a voltage command (a modulated wave) according to the embodiment.

FIG. 8 is a diagram of an example of a PWM signal waveform generated by a voltage command (a modulated wave) according to this embodiment. In FIG. 8, a voltage command waveform indicated by a thick line represents a signal waveform in an arbitrary phase (e.g., the U phase) generated by the voltage-command generating unit 21 shown in FIG. 5 (or the modulated-wave generating unit 42 shown in FIG. 6). A signal waveform (a PWM signal) formed by the voltage command and a triangular wave (a carrier signal) is a PWM signal waveform generated by the PWM-signal generating unit 23 shown in FIG. 5.

When the PWM signal waveforms shown in FIGS. 7 and 8 are compared, the PWM signal waveforms have characteristics explained below.

(1) In a section where the amplitude of the voltage command is small, t1>t1' and t5>t5'. Pulse width is larger in this embodiment.

(2) In a section where the amplitude of the voltage command is medium, t2>t2' and t4>t4'. Pulse width is slightly larger in this embodiment. However, the difference between the pulse widths is smaller than the difference between the pulse widths at the time when the amplitude of the voltage command is small.

(3) In a section where the amplitude of the voltage command is large, t3≡t3' and the pulse widths are substantially equal.

The characteristics concerning the voltage command are obtained by using a voltage command generated when the third harmonic is superimposed on a fundamental wave. That is, by using the voltage command generated when the third harmonic is superimposed on a fundamental wave, it is possible to increase the voltage output compared with a voltage output obtained when the voltage command of only the fundamental wave is used. According to this action, it is possible to more simply and effectively perform the asynchronous PWM control in all the control regions explained above.

In the control device and the control method in this embodiment, effects explained below are obtained according to characteristics concerning the voltage command waveform and structural characteristics in which, for example, switching of a control mode does not occur.

First, when a control target is an electric motor for a railway vehicle, near a modulation factor without a margin for overmodulation (e.g., near a modulation factor of 75%), even if a sudden change of an overhead wire voltage occurs, it is possible to control the modulation factor without the necessity of switching the control mode. Therefore, it is possible to improve control stability.

Asynchronous PWM control in all the control regions is possible. Therefore, during mode switching in all the control regions, it is possible to suppress harsh magnetic noise that the switching element of the inverter and the electric motor could cause.

In the control device and the control method in this embodiment, the pulse-mode switching unit, the adjustment gain table, the synchronous-three-pulse-carrier-signal generating unit, and the like are unnecessary. Therefore, it is possible to simplify the device compared with the general configuration of the past. As a result, it is possible to reduce device costs and device size.

Further, in the electric motor to which the control device and the control method in this embodiment are applied, the one-pulse mode is not used even in a high-speed control region. Therefore, it is possible to reduce vibration that could be caused by a harmonic component.

Further, because losses due to the harmonic component decrease, it is possible to suppress the cooling performance of the electric motor. Therefore, it is possible to reduce the size and the weight of the device through reviewing the cooling fin shape, the cooling duct, and the like.

In the control device and the control method in this embodiment, the asynchronous PWM control is performed in all the control regions. Therefore, a motor input voltage is closer to a sine wave and improvement of control accuracy can be attained.

Further, in the vehicle driving system in this embodiment, a regenerative brake can be used in the high-speed control region where braking was performed by a mechanical brake in the past. Therefore, it is possible to effectively utilize regenerative energy and suppress wear of the mechanical brake. As a result, it is possible to extend the life of the mechanical brake.

The switching element included in the inverter 3 in this embodiment is explained. For the switching element used in the inverter 3, a semiconductor switching element formed of silicon (Si) (hereinafter abbreviated as "Si—SW") is generally used. The technology explained above can be configured using normal Si—SW.

On the other hand, instead of the Si—SW, it is also naturally possible to use a semiconductor switching element formed of silicon carbide (SiC), which has attracted attention in recent years, (hereinafter abbreviated as "SiC—SW").

Because the SiC—SW has high voltage endurance and high allowable current density, the switching element can be reduced in size. By using switching elements that are reduced in size, it is possible to reduce the size of semiconductor modules incorporating therein the switching elements.

The SiC—SW also has high heat resistance. Therefore, in the case of a switching element that requires a cooling mechanism such as a heat sink, it is possible to reduce the size of the cooling mechanism. As a result, it is possible to further reduce the size of the switching element module.

Note that the SiC is an example of a semiconductor referred to as wide band gap semiconductor on the basis of a characteristic that its band gaps are larger than the band gaps of a Si (Conversely, the Si is referred to as a narrow-band gap semiconductor). Besides the SiC, for example, a semiconductor formed using a gallium nitride material or diamond also belongs to the wide band gap semiconductor group. Characteristics of the semiconductors also have many similarities to characteristics of silicon carbide. Therefore, a configuration including a wide band gap semiconductor other than the silicon carbide also constitutes the gist of the present invention.

INDUSTRIAL APPLICABILITY

As explained above, the present invention is useful as a control device for an electric motor for enabling a further reduction in harsh magnetic noise and vibration due to harmonic components.

REFERENCE SIGNS LIST

1 Vehicle driving system
2 Input circuit
3 Inverter
4a, 5a, 6a, 4b, 5b, 6b Switching elements
7, 50 Control units
8 Electric motor
10 Overhead wire
11 Current collector
12 Rail
13 Wheel
21, 55 Voltage-command generating units
22, 57 Asynchronous-carrier-signal generating units
23, 51 PWM-signal generating units
31 to 33, 61 to 63 Comparators
34 to 36, 64 to 66 Inverting circuits
41 Third-harmonic generating unit
42 Modulated-wave generating unit
53 Multiplier
54 Adjustment gain table
58 Synchronous-three-pulse-carrier-signal generating unit
59 Switch
60 Pulse-mode switching unit

The invention claimed is:

1. A control device for an electric motor that controls an operation of the electric motor by outputting PWM signals to switching elements included in an inverter, the inverter being capable of converting an input direct-current voltage into an alternating-current voltage having an arbitrary frequency and an arbitrary voltage, the control device for the electric motor comprising:

a voltage-command generating unit configured to generate, as voltage commands, a superimposed wave signal obtained by superimposing, on a sine wave having an output frequency of the inverter as a fundamental frequency, a third harmonic of the sine wave; and a PWM-signal generating unit configured to generate the PWM signals by comparing amplitude of the voltage commands output by the voltage-command generating unit and amplitude of a predetermined carrier signal, wherein an asynchronous carrier signal is input to the PWM-signal generating unit, and the PWM-signal generating unit generates PWM signals each including a plurality of pulses in a half cycle of an inverter output voltage and outputs the PWM signal in all control regions of the electric motor.

2. The control device for the electric motor according to claim 1, wherein the voltage-command generating unit includes:

a third-harmonic generating unit configured to generate, from an output frequency of the inverter, a third harmonic of the output frequency; and a modulated-wave generating unit configured to generate the voltage commands on the basis of the output frequency of the inverter, the third harmonic, a modulation factor, and a control phase angle.

3. The control device for the electric motor according to claim 1, wherein at least either one of each of the switching elements and a diode element connected in anti-parallel to the switching element is formed of a wide band gap semiconductor.

4. The control device for the electric motor according to claim 3, wherein the wide band gap semiconductor is a semiconductor including silicon carbide, a gallium nitride material, or diamond.

5. A control method for an electric motor for controlling an operation of the electric motor by outputting PWM signals to switching elements included in an inverter, the inverter being capable of converting an input direct-current voltage into an alternating-current voltage having an arbitrary frequency and an arbitrary voltage, the control method for the electric motor comprising:

a voltage-command generating step for generating, as voltage commands, a superimposed wave signal obtained by superimposing, on a sine wave having an output frequency of the inverter as a fundamental frequency, a third harmonic of the sine wave; and a PWM-signal generating step for generating the PWM signals including a plurality of pulses in a half cycle of an inverter output voltage in all control regions of the electric motor by comparing amplitude of the voltage commands output by the voltage-command generating step and amplitude of an asynchronous carrier signal.

6. An electric motor to which the control method according to claim 5 is applied and controlled.

7. A vehicle driving system comprising:
the control device according to claim 1;
an inverter controlled by the control device;
an input circuit configured to generate direct-current power to be input to the inverter; and
an electric motor driven by the inverter.

8. An electric motor to which the control device according to claim 1 is applied and controlled.

* * * * *